United States Patent Office.

JOHN ROSS, OF ROCKY HILL STATION, KENTUCKY.

COMPOSITION FOR PRESERVING MEATS.

SPECIFICATION forming part of Letters Patent No. 304,360, dated September 2, 1884.

Application filed March 25, 1884. (No specimens.)

*To all whom it may concern:*

Be it known that I, JOHN ROSS, a citizen of the United States, residing at Rocky Hill Station, in the county of Edmonson and State of Kentucky, have invented certain new and useful Improvements in a Composition for Preserving Meats, &c., of which the following is a specification.

This invention relates to a composition of matter for preserving meats and eggs, and for preventing flies or worms from destroying young plants or plant-beds; and it consists in compounding chromic acid, nitrate of potassium, and water in the proportions and in the manner hereinafter fully described and claimed.

The improved composition of matter consists of the following-named ingredients, compounded in the manner as hereinafter stated, viz: chromic acid, thirty grains; nitrate of potassium, four ounces; water, four gallons. Dissolve the chromic acid and the nitrate of potassium in the water. For preserving meats or eggs, let them be immersed in the water and permitted to remain in the water thus prepared for a period of from five to ten minutes, when the meat, after having been so treated, may be taken out and hung up or packed away, and will remain sound and good for an indefinite length of time. Eggs after having been thus treated for the same length of time may be packed away in tubs, barrels, or boxes, and will remain sound and sweet throughout the summer.

To prevent flies or worms from destroying young plants or plant-beds, it is only necessary to sprinkle the plants occasionally with the composition or solution as above prepared, and flies or worms will not touch them, while at the same time the water has no injurious effect upon them.

I do not claim that this composition of matter is essential as a rule to the preservation of meats, as they may be preserved without it; but under many circumstances it is very desirable, and is effectual when needed and used. For instance, it frequently happens in the Middle and Southern States that after the farmers have packed their meats for winter the weather turns warm and wet, and the meats unless attended to in this kind of weather will spoil and entail a total loss on the farmer, whereas by simply knocking off the salt and treating the meat as above described it will be preserved and none will be lost.

With reference to eggs, they are very plentiful in hot weather, and by subjecting them at this time to the treatment above described they may be packed away and kept fresh all summer.

As to young plants, neither flies nor worms will eat the plants, nor will they remain near them when they have been sprinkled with the solution as above prepared.

I am aware that chromic acid alone in water has been used to preserve meat, and I do not, broadly, claim chromic acid as an antiseptic.

Having thus fully described my invention, what I claim as new, and desire to secure by Letters Patent, is—

The herein-described composition of matter, consisting of chromic acid, nitrate of potassium, and water, in the proportions specified, and for the purposes set forth.

In testimony that I claim the above I have hereunto subscribed my name in the presence of two witnesses.

JOHN ROSS.

Witnesses:
 WILLIAM C. PERKINS,
 MICHAEL MAGESS.